(12) United States Patent
Meuler et al.

(10) Patent No.: US 10,907,070 B2
(45) Date of Patent: Feb. 2, 2021

(54) ARTICLES SUBJECT TO ICE FORMATION COMPRISING A REPELLENT SURFACE COMPRISING A SILOXANE MATERIAL

(71) Applicant: 3M INNOVATIVE PROPERTIES COMPANY, St. Paul, MN (US)

(72) Inventors: Adam J. Meuler, Woodbury, MN (US); Cheryl L. S. Elsbernd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/080,047

(22) PCT Filed: Apr. 25, 2017

(86) PCT No.: PCT/US2017/029240
§ 371 (c)(1),
(2) Date: Aug. 27, 2018

(87) PCT Pub. No.: WO2017/189475
PCT Pub. Date: Nov. 2, 2017

(65) Prior Publication Data
US 2019/0062591 A1    Feb. 28, 2019

Related U.S. Application Data

(60) Provisional application No. 62/327,799, filed on Apr. 26, 2016.

(51) Int. Cl.
| | |
|---|---|
| C09D 183/04 | (2006.01) |
| F28F 19/02 | (2006.01) |
| F28F 19/00 | (2006.01) |
| C08L 25/06 | (2006.01) |
| C08L 27/06 | (2006.01) |
| C08L 33/08 | (2006.01) |
| C08L 67/00 | (2006.01) |
| C08L 75/04 | (2006.01) |

(52) U.S. Cl.
CPC .......... *C09D 183/04* (2013.01); *F28F 19/006* (2013.01); *F28F 19/02* (2013.01); *C08L 25/06* (2013.01); *C08L 27/06* (2013.01); *C08L 33/08* (2013.01); *C08L 67/00* (2013.01); *C08L 75/04* (2013.01)

(58) Field of Classification Search
USPC .......................................................... 106/13
See application file for complete search history.

(56) References Cited

U.S. PATENT DOCUMENTS

| | | |
|---|---|---|
| 2,504,482 A | 4/1950 | Goldman |
| 2,622,598 A | 12/1952 | Rosenblum |
| 2,688,568 A | 9/1954 | Miskel |
| 2,803,656 A | 8/1957 | Ahlbrecht |
| 3,372,125 A | 3/1968 | Hill |
| 3,746,196 A | 7/1973 | Sako |
| 3,759,874 A | 9/1973 | Gresham |
| 3,787,351 A | 1/1974 | Olson |
| 4,209,610 A | 6/1980 | Mares |
| 4,301,208 A | 11/1981 | Jellinek |
| 4,508,916 A | 4/1985 | Newell |
| 4,595,628 A | 6/1986 | Kelly |
| 5,169,900 A | 12/1992 | Gudelis |
| 5,187,015 A * | 2/1993 | Yorkgitis ................. C09K 3/18 428/447 |
| 5,213,743 A | 5/1993 | Ohara |
| 5,221,497 A | 6/1993 | Watanabe |
| 5,267,693 A | 12/1993 | Dickey |
| 5,350,795 A | 9/1994 | Smith |
| 5,459,188 A | 10/1995 | Sargent |
| 5,476,901 A | 12/1995 | Smith |
| 5,560,992 A | 10/1996 | Sargent |
| 5,582,350 A | 12/1996 | Kosmyna |
| 5,618,903 A | 4/1997 | Hoxmeier |
| 5,637,657 A | 6/1997 | Anton |
| 5,641,835 A | 6/1997 | Smith |
| 5,670,573 A | 9/1997 | Kirchner |
| 5,674,592 A | 10/1997 | Clark |
| 5,728,469 A | 3/1998 | Mann |

(Continued)

FOREIGN PATENT DOCUMENTS

| | | |
|---|---|---|
| CA | 2079542 | 4/1993 |
| CN | 1279697 | 1/2001 |

(Continued)

OTHER PUBLICATIONS

Product data sheet for Nusil r-2180 (no date).*
"Adaptive Surface Coatings, High Performance, Low Environmental Impact", [retrieved from the internet on Jun. 18, 2018], URL < https://adaptivesurface.tech/ >, previously Slips technologies, pp. 1-6.
Bohn, "Insect Aquaplaning: Nepenthes Pitcher Plants Capture Prey with the Peristome, a Fully Wettable Water-Lubricated Anisotropic Surface", Proceedings of the National Academy of Sciences, Sep. 28, 2004, vol. 101, No. 39, pp. 14138-14143.
Bragg, The Form Birefringence of Macromolecules, Acta Cryst. 1953, vol. 6, pp. 865-867.
Cab-O-Sperse Dipersions for Industrial Coatings, Application Guide, Cabot, 2013, 2 pages.

(Continued)

*Primary Examiner* — Marc S Zimmer
(74) *Attorney, Agent, or Firm* — Carolyn A. Fischer

(57) ABSTRACT

Articles subject to ice formation during normal use, are described comprising a repellent surface such that the receding contact angle of the surface with water ranges from (90) degrees to (135) degrees wherein the repellent surface comprises a siloxane material. In one embodiment, the repellent surface further comprises a non-fluorinated organic polymeric binder. In another embodiment, the repellent surface comprises a thermally processable polymer and a siloxane material melt additive. Also described are methods of making an article comprising providing an article subject to ice formation during normal use; and providing a liquid repellent surface, as described herein, on at least a portion of the article.

22 Claims, 1 Drawing Sheet

(56) References Cited

U.S. PATENT DOCUMENTS

| | | |
|---|---|---|
| 5,747,392 A | 5/1998 | Xiao |
| 5,789,491 A | 8/1998 | Liss |
| 5,798,402 A | 8/1998 | Fitzgerald |
| 5,859,126 A | 1/1999 | Anton |
| 5,898,046 A | 4/1999 | Raiford |
| 5,914,384 A | 6/1999 | Anton |
| 5,977,390 A | 11/1999 | Raiford |
| 6,013,715 A | 1/2000 | Gornowicz |
| 6,063,474 A | 5/2000 | Raiford |
| 6,114,419 A | 9/2000 | Liss |
| 6,127,485 A | 10/2000 | Klun |
| 6,150,020 A | 11/2000 | Dharmadhikary |
| 6,171,983 B1 | 1/2001 | Coppens |
| 6,183,872 B1 | 2/2001 | Tanaka |
| 6,262,180 B1 | 7/2001 | Klun |
| 6,361,870 B1 | 3/2002 | Steffl |
| 6,362,135 B1 | 3/2002 | Greer |
| 6,387,999 B1 | 5/2002 | Dirschl |
| 6,462,115 B1 | 10/2002 | Takahashi |
| 6,465,107 B1 | 10/2002 | Kelly |
| 6,511,753 B1 | 1/2003 | Teranishi |
| 6,586,522 B1 | 7/2003 | Jariwala |
| 6,664,318 B1 | 12/2003 | Bymark |
| 6,753,380 B2 | 6/2004 | Qiu |
| 6,803,109 B2 | 10/2004 | Qiu |
| 6,860,926 B2 | 3/2005 | Ishikawa |
| 6,908,607 B2 | 6/2005 | Banerjee |
| 7,041,727 B2 | 5/2006 | Kubicek |
| 7,105,233 B2 | 9/2006 | Bechthold |
| 7,375,698 B2 | 5/2008 | Wolfenden |
| 7,396,866 B2 | 7/2008 | Jariwala |
| 7,399,807 B2 | 7/2008 | Day |
| 7,659,351 B2 | 2/2010 | Caldwell |
| 7,718,264 B2 | 5/2010 | Klun |
| 7,857,905 B2 | 12/2010 | Hayes |
| 7,897,666 B1 | 3/2011 | Berg |
| 8,497,021 B2 | 7/2013 | Simpson |
| 8,535,779 B1 | 9/2013 | Smith |
| 8,574,704 B2 | 11/2013 | Smith |
| 8,821,984 B2 | 9/2014 | Jariwala |
| 8,993,116 B2 | 3/2015 | Jariwala |
| 9,012,548 B2 | 4/2015 | Inagaki |
| 9,175,188 B2 | 11/2015 | Buckanin |
| 9,187,678 B2 | 11/2015 | Boardman |
| 9,197,678 B2 | 11/2015 | Heinla |
| 9,353,646 B2 | 5/2016 | Aizenberg |
| 9,371,173 B2 | 6/2016 | Smith |
| 9,441,079 B2 | 9/2016 | Yang |
| 2003/0235696 A1 | 12/2003 | Byrd |
| 2004/0037961 A1 | 2/2004 | Dieleman |
| 2004/0092675 A1 | 5/2004 | Moore |
| 2005/0016489 A1 | 1/2005 | Endicott |
| 2005/0054804 A1 | 3/2005 | Dams |
| 2005/0121644 A1 | 6/2005 | Dams |
| 2005/0143541 A1 | 6/2005 | Caldwell |
| 2005/0145134 A1 | 7/2005 | Petrin |
| 2005/0164010 A1 | 7/2005 | Trombetta |
| 2005/0234147 A1 | 10/2005 | Sakabe |
| 2006/0142474 A1 | 6/2006 | Moore |
| 2006/0153993 A1 | 7/2006 | Schmidt |
| 2006/0209127 A1 | 9/2006 | Inoue |
| 2006/0248656 A1 | 11/2006 | Tung |
| 2006/0281861 A1 | 12/2006 | Putnam |
| 2008/0039558 A1 | 2/2008 | Lazzari |
| 2008/0047465 A1 | 2/2008 | Yen |
| 2008/0299347 A1 | 12/2008 | Ukei |
| 2008/0306238 A1 | 12/2008 | Jariwala |
| 2009/0069464 A1 | 3/2009 | Standke |
| 2009/0081384 A1 | 3/2009 | Plissonnier |
| 2009/0159751 A1 | 6/2009 | Wittmer |
| 2009/0203276 A1 | 8/2009 | Kutsenko |
| 2009/0294724 A1 | 12/2009 | Attar |
| 2010/0035039 A1 | 2/2010 | Jing |
| 2010/0047845 A1 | 2/2010 | Woodside |
| 2010/0092621 A1 | 4/2010 | Akutsu |
| 2010/0107556 A1 | 5/2010 | Monti |
| 2010/0314575 A1 | 12/2010 | Gao |
| 2011/0033694 A1 | 2/2011 | Jing |
| 2011/0135839 A1 | 6/2011 | Dziomkina |
| 2011/0207038 A1 | 8/2011 | Yu |
| 2011/0229667 A1 | 9/2011 | Jin |
| 2011/0305738 A1 | 12/2011 | Ladizinsky |
| 2012/0058330 A1* | 3/2012 | Smith ..................... C08L 83/04 428/327 |
| 2012/0107556 A1 | 5/2012 | Zhang |
| 2013/0045332 A1 | 2/2013 | Fang |
| 2013/0140004 A1 | 6/2013 | Behrens |
| 2013/0178568 A1 | 7/2013 | Meuler |
| 2013/0216820 A1 | 8/2013 | Riddle |
| 2013/0224478 A1 | 8/2013 | Jing |
| 2013/0251946 A1 | 9/2013 | Azimi |
| 2014/0120340 A1 | 5/2014 | Riddle |
| 2014/0147627 A1 | 5/2014 | Aizenberg |
| 2014/0147631 A1 | 5/2014 | Yang et al. |
| 2014/0178611 A1 | 6/2014 | Smith |
| 2014/0287243 A1 | 9/2014 | Weber |
| 2014/0295149 A1 | 10/2014 | Ito |
| 2014/0311940 A1 | 10/2014 | Braveman |
| 2014/0322543 A1 | 10/2014 | Jonckheree |
| 2015/0030796 A1 | 1/2015 | Boardman |
| 2015/0038909 A1 | 2/2015 | Christensen et al. |
| 2015/0166820 A1 | 6/2015 | Ikeyama |
| 2015/0273522 A1 | 10/2015 | Boscher |
| 2015/0352546 A1 | 12/2015 | Egeler |
| 2015/0353813 A1* | 12/2015 | Guenthner ............... C09K 8/52 507/90 |
| 2016/0200915 A1 | 7/2016 | Radchenko |

FOREIGN PATENT DOCUMENTS

| | | |
|---|---|---|
| CN | 101358106 | 2/2009 |
| CN | 102031057 | 11/2010 |
| CN | 102321415 | 1/2012 |
| CN | 103998414 | 8/2014 |
| DE | 10004132 | 8/2001 |
| EP | 0339583 | 11/1989 |
| EP | 0484093 | 5/1992 |
| EP | 0860490 | 8/1998 |
| EP | 0905179 | 3/1999 |
| EP | 0768921 | 10/1999 |
| EP | 1493761 | 1/2005 |
| EP | 2607397 | 6/2013 |
| JP | S56-154860 | 11/1981 |
| JP | S61-023656 | 7/1984 |
| JP | H01313582 | 12/1989 |
| JP | 3-41160 | 2/1991 |
| JP | 4-5260 | 1/1992 |
| JP | H045260 | 1/1992 |
| JP | H04149294 | 5/1992 |
| JP | H4270649 | 9/1992 |
| JP | 5-239381 | 9/1993 |
| JP | 5-331407 | 12/1993 |
| JP | 05338087 | 12/1993 |
| JP | H06316548 | 11/1994 |
| JP | 2000-087014 | 3/2000 |
| JP | 2001-508698 | 7/2001 |
| JP | 2002-053792 | 2/2002 |
| JP | 3306454 | 7/2002 |
| JP | 2004-531598 | 10/2004 |
| JP | 2007-297543 | 11/2007 |
| JP | 2008-524376 | 7/2008 |
| JP | 2014-509959 | 7/2008 |
| JP | 2010-222559 | 10/2010 |
| JP | 201167710 | 4/2011 |
| JP | 2015-144548 | 8/2015 |
| WO | WO 94/26830 | 11/1994 |
| WO | WO 1996-01152 | 1/1996 |
| WO | WO 1996-39349 | 12/1996 |
| WO | WO 1998-32539 | 7/1998 |
| WO | WO 1998-43886 | 10/1998 |
| WO | WO 2002/072657 | 9/2002 |
| WO | WO 2004-090065 | 10/2004 |
| WO | WO 2005/113690 | 12/2005 |
| WO | WO 2008-104063 | 9/2008 |

(56) References Cited

FOREIGN PATENT DOCUMENTS

| | | |
|---|---|---|
| WO | WO 2008-154414 | 12/2008 |
| WO | WO 2009/009185 | 1/2009 |
| WO | WO 2009-045856 | 4/2009 |
| WO | WO 2010-002859 | 1/2010 |
| WO | WO 2010/062843 | 6/2010 |
| WO | WO 2012-064646 | 5/2012 |
| WO | WO 2012-100099 | 7/2012 |
| WO | WO 2012-121858 | 9/2012 |
| WO | WO 2012-173803 | 12/2012 |
| WO | WO 2013/016594 | 1/2013 |
| WO | WO 2013-115868 | 8/2013 |
| WO | WO 2013-127054 | 9/2013 |
| WO | WO 2013-172823 | 11/2013 |
| WO | WO 2013-177579 | 11/2013 |
| WO | WO 2014-010534 | 1/2014 |
| WO | WO 2014-012039 | 1/2014 |
| WO | WO 2014-012052 | 1/2014 |
| WO | WO 2014-012072 | 1/2014 |
| WO | WO 2014-012078 | 1/2014 |
| WO | WO 2014-012079 | 1/2014 |
| WO | WO 2014-012080 | 1/2014 |
| WO | WO 2014/035742 | 3/2014 |
| WO | WO 2014/053636 | 4/2014 |
| WO | WO 2014-078867 | 5/2014 |
| WO | WO 2014-097309 | 6/2014 |
| WO | WO 2014097309 | 6/2014 |
| WO | WO 2014-107811 | 7/2014 |
| WO | WO 2014-148909 | 9/2014 |
| WO | WO 2014-209441 | 12/2014 |
| WO | WO 2015/031601 | 3/2015 |
| WO | WO 2015-074077 | 5/2015 |
| WO | WO 2015/157219 | 10/2015 |
| WO | WO 2015/161233 | 10/2015 |
| WO | WO 2016-069239 | 5/2016 |
| WO | WO 2016-069674 | 5/2016 |
| WO | WO 2016-176350 | 11/2016 |
| WO | WO 2017-074708 | 5/2017 |
| WO | WO 2017-074709 | 5/2017 |
| WO | WO 2017-074817 | 5/2017 |
| WO | WO 2017-189215 | 11/2017 |
| WO | WO 2017-189475 | 11/2017 |
| WO | WO 2017-189681 | 11/2017 |
| WO | WO 2017-189684 | 11/2017 |

OTHER PUBLICATIONS

Chhatre, "Thermal Annealing Treatment to Achieve Switchable and Reversible Oleophobicity on Fabrics," Langmuir, 2009, vol. 25, pp. 13625-13632.
Chhatre, "Fluoroalkylated Silicon-Containing Surfaces—Estimation of Solid-Surface Energy", Applied materials and interfaces, 2010, No. 12, vol. 02, pp. 3544-3554.
Deltron High Velocity Clearcoat, DC3000, 2006, 4 pages.
Diatomaceous earth, [Online] {retrieved from internet on Jun. 8, 2014}, URL <http:1 /en.wikipedia.org/wiki/Diatomaceous earth>, 1 page.
Douillard et al. "Contact Angles of Water-2-Butoxyethanol System Against Glass Exploration of the Phase Diagram," Advances in Colloid and Interface Science 39 (1992) 225-234.
DuPont FEP Film, Fluorocarbon Film—Information bulletin, Dupont, 9pages.
DuPont Teflon PTFE fluoropolymer resin, 38 pages.
DuPont Zonyl 8857A, Anti-Block and cleanability Additive, Dupont, 2pages.
DuPont Zonyl Fluoroadditives for coatings Technical Information, 2003, 4 pages.
Earlex HV5500 or HV6900 1 qt. PTFE Coated Metal Paint Container, 2015, 2 pages.
Elvacite 1010 Macromonomer, Lucite International Inc., Specialty, Polymers & Resins Ltd, 5 pages.
Estane 5703 TPU, Lubrizol Engineered Polymers, 2014, 1 page.
Gao, "Teflon is Hydrophilic. Comments on Definitions of Hydrophobic, Shear versus Tensile Hydrophobicity, and Wettability Characterization", Langmuir, 2008, vol. 24, No. 17, pp. 9183-9188.
Gao, "Wetting 101," Langmuir, Jul. 2009, vol. 25, No. 24, pp. 14105-14115.
Gelest Inc., "Silane Coupling Agents: Connecting Across Boundaries v. 2.0," 2006, pp. 1-54.
Gemici, Hydrothermal Treatment of Nanoparticle Thin Films for Enhanced Mechanical Durability, Langmuir, 2008, vol. 24, pp. 2168-2177.
Huang, "Omniphobic Slippery Coatings Based on Lubricant-Infused Porous Polyelectrolyte Multilayers", ACS Macro Lett. 2013, vol. 2, pp. 826-829.
Jellinek, "Ice releasing block-copolymer coating", Colloid & Polymer Science, 1978, vol. 256, No. 6, pp. 544-551.
Krumpfer, "Contact angle hysteresis: a different view and a trivial recipe for low hysteresis hydrophobic surfaces", Faraday Discussions, 2010, vol. 146, pp. 103-111.
Li, What do we need for a superhydrophobic surface? A review on the recent progress in the preparation of superhydrophobic surfaces, Chem. Soc. Rev., 2007, vol. 36, pp. 1350-1368.
LiquiGlide Coating for Paint Eliminates a Sticky Problem, 2 pages.
Madani, The aggregation status of nanosilicas and silica fume, used in cementitious mixtures, Third International Conference on Sustainable Construction Materials and Technologies, 10 pages.
Marflex 1122 Polyethylene-Safety data sheet, Chevron Philips, 2015, 10pages.
Material Safety Data Sheet, Envirobase HP, Sep. 9, 2014, 11 pages.
Material Safety Data Sheet, High Velocity Clearcoat, DC3000, Mar. 15, 2014, 11 pages.
Material Safety Data Sheet, Mid Temp Hardener, DCH3085, Mar. 15, 2014, 10 pages.
Meuler, "Examination of wettability and surface energy in fluorodecyl POSS/polymer blends", The Royal Society of Chemistry, 2011, vol. 7, pp. 10122-10134.
Meuler, "Relationships between Water Wettability and Ice Adhesion", Applied Materials and Interfaces, 2010, vol. 2, No. 11, pp. 3100-3110.
Norton FEP Fluoropolymer Film, Saint-Gobain Performance Plastics Corporation, 2002, 2 pages.
O'Lenick Jr., "Alkyl Dimethicone", Chapter 10, Silicones for Personal Care, 2nd Edition, pp. 171-175.
Parent, "Anti-Icing and De-Icing Techniques for Wind Turbines: Critical Review", Cold Regions Science and Technology, vol. 65, 2011, pp. 88-96.
Quere, "Non-Sticking Drops", Reports on Progress in physics, Sep. 7, 2005, vol. 68, No. 11, pp. 2495-2532.
Ryan, "Ultra-High-Molecular-Weight Functional Siloxane Additives in Polymer. Effects on Processing and Properties", Journal of Vinyl & Additive Technology, 2000, vol. 06, No. 01, pp. 07-19.
Sacramento Metro AQMD Rule 459 PPG Envirobase High Performance, 2014, 2 pages.
Safety Data Sheet MarFlex 1122 Polyethylene Chevron Phillips Chemical Company LP, Jan. 1, 31, 2015, 10 pages.
Safety Data Sheet, Poly (methyl methacrylate), AlfaAesar A Johnson Matthey Company, May 29, 2015, 4 pages.
Safety Data Sheet, Poly (vinyl chloride), Sigma-Aldrich, Aug. 25, 2015, 8 pages.
Safety Data Sheet, Polystyrene, atactic, Apr. 29, 2015, 4 pages.
Safety Data Sheet, Teflon AF Amorphous Fluoropolymer, 4 pages.
Sayward, "Seeking Low Ice Adhesion", Special Report 79-11; U.S. Army Cold Regions Research and Engineering Laboratory, Hanover, NH, Apr. 1979, 87 pages.
Silazanes-Organosilicon, [Online] [retrieved from internet on Sep. 4, 2014] URL <http: //www.sigmaaldrich.com/chemistry /chemistry-products.html ? TablePage=16245452>, 1 page.
Smith, "Droplet mobility on lubricant-impregnated surfaces-+", Soft Matter, 2013, vol. 9, No. 6, pp. 1772-1780.
Styron 685D—Product information, AmSty, 2014, 2pages.
Estane 5703 TPU, Lubrizol Engineered Polymers, 3pages.
Teflon AF Amorphous Fluoropolymer—Safety data sheet, Dupont, 2007, 4pages.

(56) References Cited

OTHER PUBLICATIONS

Teflon Beaker Liner Pricing, Welch Fluorocarbon Inc., Feb. 24, 2012, 1 page.
Teng, Overview of the Development of the Fluoropolymer Industry, Applied Science, 2012, vol. 2, pp. 496-512.
The use of Aerodisp fumed silica dispersions to enhance waterborne coatings, Technical Information 1371, Evonik, 16 pages.
Tuteja, "Robust Omniphobic surfaces", Nov. 25, 2008, vol. 105, No. 47, pp. 18200-18205.
Wong, "Bioinspired Self-Repairing Slippery Surfaces with Pressure-Stable Omniphobicity", Nature, Sep. 22, 2011, vol. 477, pp. 443-447.
International Search Report for PCT International Application No. PCT/US2015/057686 dated Mar. 2, 2016, 6 pages.
International Search Report and Written Opinion for PCT International Application No. PCT/US2015/054820, dated May 23, 2016, 12 pgs.
International Search Report for PCT International Application No. PCT/US2016/056742, dated Jan. 16, 2017, 5 pages.
International Search Report and Written Opinion for PCT International Application No. PCT/US2016/056749, dated Jan. 12, 2017, 7 pgs.
International Search Report and Written Opinion for PCT International Application No. PCT/US2016/058166, dated Feb. 6, 2017, 17 pgs.
Li, et al., "Formation of icephobic film from POSS-containing fluorosilicone multi-block methacrylate copolymers," Progress in Organic Coatings, vol. 89, 2015, pp. 150-159.
Li, et al., "Synthesis of POSS-containing fluorosilicone block copolymers via RAFT polymerization for application as non-wetting coating materials," Progress in Organic Coatings, vol. 78, 2015, pp. 188-199.
Mabry, et al., "Fluorinated Polyhedral Oligomeric Silseqquioxanes (F-POSS)," Angewandte Chemie International Edition, vol. 47, 2008, pp. 4137-4140.
Ramirez, et al., "Reversible addition-fragmentation chain transfer (RAFT) copolymerization of fluoroalkyl polyhedral oligomeric silsesquioxane (F-POSS) macromers," Polymer Chemistry, vol. 4, 2013, pp. 2230-2234.
Srinivasan, et al., "Solution spraying of poly(methyl methacrylate) blends to fabricate microtextured, superoleophobic surfaces," Polymer, vol. 52, 2011, pp. 3209-3218.
Cansealid Paint Can Lids, http://www.cansealid.com, pp. 1-4, Mar. 30, 2017.
Dow Corning MB50-002 Masterbatch Product Information, Jun. 2, 2014, pp. 1-4.
Liquiglide, Videos available on the website <www.liquiglide.com>, Accessed on Jul. 31, 2014, 5 pages.
Yilgor, Progress in Polymer Science Silicone containing copolymers: Synthesis, properties and applications 2014 1165-1195.
Dalili, et al., "A review of surface engineering issues critical to wind turbine performance, Renewable & Sustainable Energy Reviews," vol. 13, (2009), pp. 428-438.

\* cited by examiner

ARTICLES SUBJECT TO ICE FORMATION COMPRISING A REPELLENT SURFACE COMPRISING A SILOXANE MATERIAL

CROSS REFERENCE TO RELATED APPLICATIONS

This application is a national stage filing under 35 U.S.C. 371 of PCT/US2017/029240, filed Apr. 25, 2017, which claims the benefit of U.S. Provisional Application No. 62/327,799, filed Apr. 26, 2016, the disclosure of which is incorporated by reference in its/their entirety herein.

SUMMARY

Articles subject to ice formation during normal use, are described comprising a repellent surface such that the receding contact angle of the surface with water ranges from 90 degrees to 135 degrees wherein the repellent surface comprises a siloxane material.

In one embodiment, the repellent surface further comprises a non-fluorinated organic polymeric binder. In another embodiment, the repellent surface comprises a thermally processable polymer and a siloxane material melt additive.

Also described are methods of making an article comprising providing an article subject to ice formation during normal use; and providing a liquid repellent surface, as described herein, on at least a portion of the article.

DETAILED DESCRIPTION

Figure 1:
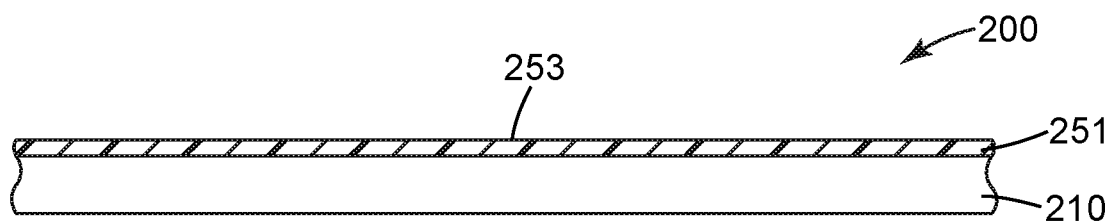
FIG. 1 is cross-sectional view of an embodied substrate comprising a repellent surface layer.

Presently described are articles or components thereof that are subject to ice formation during their normal use. The term "ice" includes any form of frozen water including frost, freezing rain, sleet and snow.

Representative articles include sign faces, signal transmission lines (e.g., telephone and electrical cables), satellite dishes, antennas, wind turbine blades, automobiles, railroad cars, aircraft, watercraft, navigation equipment, heat pumps and exchangers or components thereof, ice manufacturing facilities and articles including ice-cube trays and other "ice maker" components; commercial and residential refrigerators and freezers; cryogenic and supercomputer storage facilities; buildings, transportation signs, roofing, dams (especially near a lock), oil drilling platforms, outdoor sporting equipment; recreational vehicles such as snowmobiles, and snow removal equipment.

A heat exchanger is an article used to transfer heat between one or more fluids. The fluids may be separated by a solid wall to prevent mixing or they may be in direct contact. They are widely used in space heating, refrigeration, air conditioning, power stations, chemical plants, petrochemical plants, petroleum refineries, natural-gas processing, and sewage treatment. The classic example of a heat exchanger is found in an internal combustion engine in which a circulating fluid known as engine coolant flows through radiator coils and air flows past the coils, which cools the coolant and heats the incoming air.

Types of heat exchangers include: shell and tube heat exchanger, plate heat exchangers, plate and shell heat exchanger, adiabatic wheel heat exchanger, plate fin heat exchanger, pillow plate heat exchanger, fluid heat exchanger, waste heat recovery units, dynamic scraped surface heat exchanger, phase-change heat exchangers, direct contact heat exchangers, microchannel heat exchangers.

One of the widest uses of heat exchangers is for air conditioning of buildings and vehicles. This class of heat exchangers is commonly called air coils, or just coils due to their often-serpentine internal tubing. Liquid-to-air, or air-to-liquid HVAC (i.e. heating, ventilation and air conditioning) coils are typically of modified crossflow arrangement. In vehicles, heat coils are often called heater cores.

On the liquid side of these heat exchangers, the common fluids are water, a water-glycol solution, steam, or a refrigerant. For heating coils, hot water and steam are the most common, and this heated fluid is supplied by boilers, for example. For cooling coils, chilled water and refrigerant are most common. Chilled water is supplied from a chiller that is potentially located very far away, but refrigerant must come from a nearby condensing unit. When a refrigerant is used, the cooling coil is the evaporator in the vapor-compression refrigeration cycle. HVAC coils that use this direct-expansion of refrigerants are commonly called DX coils. Some DX coils are "microchannel" type.

On the air side of HVAC coils a significant difference exists between those used for heating, and those for cooling. Air that is cooled often has moisture condensing out of it, except with extremely dry air flows. Heating some air increases that airflow's capacity to hold water. Thus, heating coils need not consider moisture condensation on their air-side. However, cooling coils are designed and selected to handle latent (moisture) as well as the adequate (cooling) loads. The water that is removed is called condensate.

With reference to FIG. 1, article 200 comprises substrate 210 comprising a (e.g. liquid) repellent surface layer (e.g. layer) 251 that comprises a (e.g. non-fluorinated) organic polymeric binder and a silane or siloxane material. The concentration of siloxane material at the outer exposed surface 253 is typically higher than the concentration of siloxane material within the (e.g. non-fluorinated) organic polymeric binder layer 251 proximate substrate 210. The (e.g. liquid) repellent surface layer can be provided by coating substrate 210 with a coating composition comprising an organic solvent, a (e.g. non-fluorinated) organic polymeric binder, and a siloxane material; as will subsequently be described.

Figure 2:
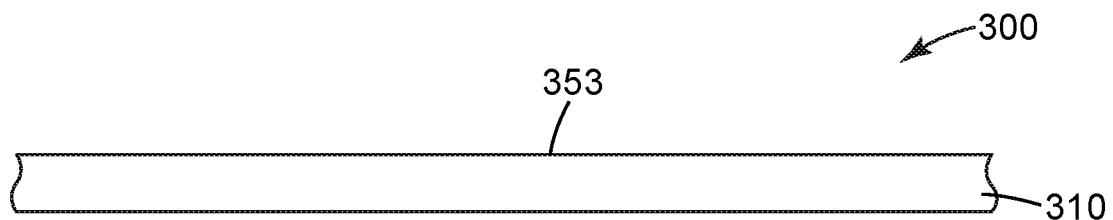
FIG. 2 is cross-sectional view of another embodiment of an article comprising a repellent surface.

With reference to FIG. 2, article 300 comprises substrate 310 comprising a (e.g. liquid) repellent surface (e.g. layer) 353 that comprises a siloxane material. The concentration of siloxane material at the outer exposed surface (e.g. layer) 353 is typically higher than the concentration of siloxane material proximate the center of the substrate 310. In one embodiment, the (e.g. liquid) repellent surface 353 can be provided by including a siloxane material, such as a siloxane compound, as a melt additive in a polymeric material that is thermally processed to form substrate 310 into a component or a surface layer thereof.

The repellent surface repels ice and typically also repels liquids such as water, aqueous solutions and mixtures including paint.

In some embodiments, the inclusion of the repellent surface can aid in the removal of ice accumulation from the repellent surface. For example, the inclusion of the repellent surface may reduce the force required to remove the ice from the repellent surface. Further, the article may be capable of repeatedly releasing ice from the repellent surface.

In other embodiments, the inclusion of the repellent coating may reduce or prevent ice build-up on the repellent surface. The repellent coating or surface may also reduce the time required to remove ice which has formed on a substrate when the substrate is thawed/defrosted.

The outer exposed surface 253 is preferably (e.g. ice, liquid) repellent such that the advancing and/or receding contact angle of the surface with water is least 90, 95, 100, 105, 110, or 115 degrees. The advancing and/or receding contact angle is typically no greater than 135, 134, 133, 132, 131 or 130 degrees and in some embodiments, no greater than 129, 128, 127, 126, 125, 124, 123, 122, 121, or 120 degrees. The difference between the advancing and/or receding contact angle with water of the (e.g. ice, liquid) repellent surface layer can be at least 5, 10, 15, 20, 25, 30, 35, 40, 45, or 50 degrees. In some embodiments, the difference between the advancing and receding contact angle with water of the surface layer is no greater than 15, 14, 13, 12, 11, 10, 9, 8, 7, 6, 5, 4, 3, 2, or 1 degree. As the difference between the advancing and receding contact angle with water increases, the tilt angle needed to slide or roll off a (e.g. water) droplet from a planar surface increases. One of ordinary skill appreciates that deionized water is utilized when determining contact angles with water.

In some embodiments, the outer exposed surface 253 exhibits a contact angle in the ranges just described after soaking in water for 24 hours at room temperature (25° C.). The contact angle of the (e.g. ice, liquid) repellent surface can also be evaluated with other liquids instead of water such as a solution of 10% by weight 2-n-butoxyethanol and 90% by weight deionized water. In some embodiments, the advancing contact angle with such 2-n-butoxyethanol solution is at least 50, 51, 52, 53, 54, 55, 56, 57, 58, 59, 60, 61, 62, 63, 64, 65, 66, 67, 68, 69, 70 degrees and in some embodiments at least 75 or 80 degrees. In some embodiments, the receding contact angle with such 2-n-butoxyethanol solution is at least 40, 45, 50, 55, 60, 65, or 70 degrees. In some embodiments, the advancing and/or receding contact angle of the (e.g. ice, liquid) repellent surface with such 2-n-butoxyethanol solution is no greater than 100, 95, 90, 85, 80, or 75 degrees.

The surface layer is not a lubricant impregnated surface. Rather the outer exposed surface is predominantly a solid (e.g. ice, liquid) repellent material. In this embodiment, less than 50, 45, 40, 35, 30, 25, 20, 15, 10, 5, 4, 3, 2, 1, 0.5, 0.1, 0.005, 0.001% of the surface area is a liquid lubricant. Rather, at least 50, 55, 60, 65, 70, 75, 80, 85, 90, 95, 96, 97, 98, 99, 99.5%, or greater of the outer exposed surface is a solid repellent material, as described herein. Thus, a liquid (e.g. water, oil, paint) or solid (e.g. ice) that is being repelled comes in contact with and is repelled by the solid repellent material.

The repellent material is generally a solid at the use temperature of the coated substrate or article, which can be as low as −60° F. or −80° F., yet more typically ranges from −40° F. to 120° F. For outdoor usage in moderate climates, the typical use temperature may be at least −20° F., −10° F., 0° F., or 10° F. In typical embodiments, the repellent material is a solid at room temperature (e.g. 25° C.) and temperatures ranging from 40° F. (4.44° C.) to 130° F. (54.4° C.). In typical embodiments the repellent material has a melting temperature (peak endotherm as measured by DSC) of greater than 25° C. and also typically greater than 130° F. (54.4° C.). In some embodiments, the repellent material has a melting temperature no greater than 200° C. In typical embodiments, a single solid repellent material is utilized. However, the coating composition may contain a mixture of solid repellent materials.

The repellent material has no solubility or only trace solubility with water, e.g., a solubility of 0.01 g/l or 0.001 g/l or less.

The (e.g. liquid, ice) repellent surface layer comprises a siloxane material and a (e.g. non-fluorinated) organic polymeric binder. In typical embodiments, a major amount of non-fluorinated polymeric binder is combined with a sufficient amount of siloxane material that provides the desired ice and liquid repellency properties, as previously described.

In typical embodiments, the amount of siloxane material is at least about 0.005, 0.10, 0.25, 0.5, 1.5, 2.0, or 2.5 wt.-% and in some embodiments, at least about 3.0, 3.5, 4.0, 4.5, or 5 wt.-%.

The amount of siloxane material is typically no greater than 50, 45, 40, 35, 30, 25, 20, or 15 wt.-% of the sum of the siloxane material and (e.g., non-fluorinated) polymeric binder.

The (e.g. liquid, ice) repellent surface comprises a siloxane (e.g. PDMS) material. In some embodiments, the siloxane (e.g. PDMS) material is a solid rather than a liquid (e.g. lubricant) at 25° C. and at temperatures ranging from 40° F. (4.44° C.) to 130° F. (54.4° C.). In typical embodiments the siloxane (e.g. PDMS) material is free of fluorinated groups and thus free of fluorine atoms. In other embodiments, a predominantly siloxane (e.g. PDMS) material may further comprise one or more fluorinated groups. Further, a combination of a fluorochemical material (e.g. such as described in 77291US002 and 77291US004; incorporated herein by reference) and a siloxane (e.g. PDMS) material can be utilized.

In some embodiments, a major amount of non-fluorinated polymeric binder or thermally processible polymer is combined with a sufficient amount of siloxane (e.g. PDMS) material that provides the desired repellency properties, as previously described.

In some embodiments, the silicone material is a compound, oligomer or polymer having a polysiloxane backbone and more typically a polydimethylsiloxane backbone. The polysiloxane backbone may further comprise other pendent groups, such as hydrocarbon (e.g. preferably alkyl) groups. The silicone material typically does not comprise vinyl groups or other polymerizable group that would results in the silicone material forming a crosslinked network.

In some embodiments, the siloxane (e.g. PDMS) material (e.g. oligomer or polymer) comprises at least 50, 55, 60, 65, 70, 75, 80, 85, 90 or 95 wt.-% polydimethylsiloxane backbone. The siloxane (e.g. PDMS) material may further comprise pendent longer chain hydrocarbon (e.g. preferably alkyl) groups in an amount of at least 5, 10, 15, 20, 25, 30, or 35 wt.-% of the siloxane (e.g. PDMS) material.

The siloxane (e.g. PDMS) oligomer may have a number average molecular weight (Mn) of at least 1500 or 2000 g/mole as measured by Gel Permeation Chromatography using polystyrene standards. The siloxane oligomer typically has a molecular weight (Mn) no greater than 10,000, 9000, 8000, or 7000 g/mole. The siloxane (e.g. PDMS) polymer typically has a molecular weight (Mn) greater than 10,000; 15,000; or 20,000 g/mole. In some embodiments, the molecular weight of the siloxane oligomer is no greater than 100,000; 75,000; or 50,000 g/mole.

In some embodiments, the siloxane (e.g. PDMS) material comprises pendent longer chain hydrocarbon (e.g. preferably alkyl) groups wherein the longer chain hydrocarbon (e.g. preferably alkyl) groups average at least 8, 10, 12, 14, 16, 18, or 20 carbon atoms. In some embodiments, the siloxane (e.g. PDMS) material comprises pendent longer chain hydrocarbon (e.g. preferably alkyl) groups wherein the longer chain hydrocarbon (e.g. preferably alkyl) groups average greater than 20 carbons atoms such as at least 25, 30, 35, or 40. The pendent longer chain hydrocarbon (e.g. preferably alkyl) groups typically average no greater than 75, 70, 65, 60, or 50 carbon atoms.

In some embodiments, the siloxane (e.g. PDMS) material may be characterized as an alkyl dimethicone. The alkyl dimethicone comprises at least one linear, branched, or cyclic alkyl group averaging at least 8, 10, or 12 carbon atoms such as lauryl dimethicone, depicted as follows:

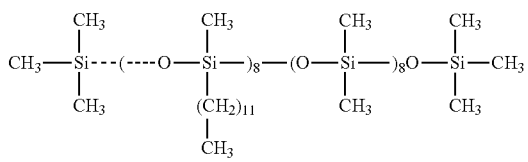

In some embodiments, the alkyl dimethicone comprises at least one linear, branched, or cyclic alkyl group averaging at least 14, 16, or 18 carbon atoms such as cetyl dimethicone and stearyl dimethicone.

These material are characterized by having a (e.g. linear) polysiloxane backbone having terminal alkyl (C1-C4, typically methyl) silane groups and a pendent (e.g. linear) alkyl group.

Preferred alkyl dimethicones typically have the structure:

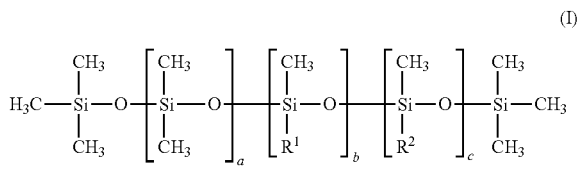

(I)

wherein the sum of (a+b+c) is between about 100 and 1000, for example between about 200 and 500 or between about 300 and 400; the ratio of a to the sum of (b+c) is about 99.9:0.1 to 80:20, or about 99:1 to 85:15, or about 99:1 to 90:10, or about 99:1 to 92:8, or about 98:2 to 93:7 or about or about 98:2 to 94:6; $R^1$ is a linear, branched, or cyclic alkyl group having between 20 and 50 carbon atoms, for example about 22 to 46 carbon atoms, or about 24 to 40 carbon atoms; $R^2$ is a linear, branched, or cyclic alkyl or alkaryl group having between 2 and 16 carbons, for example about 4 to 16, or about 5 to 12, or about 6, to 10, or about 8 carbon atoms; and the structure is a random, block, or blocky structure. In some embodiments, the ratio of a to (b+c) in conjunction with the number of carbons in the $R^1$ and $R^2$ groups result in an alkyl dimethicones having greater than about 50 wt % dimethyl siloxane (a) units, or in embodiments greater than about 60 wt % dimethyl siloxane units. In some embodiments, c is 0. In some embodiments, the sum of (a+b+c) is about 300 to 400 and the ratio of a to the sum of (b+c) is about 98:2 to 94:6. In embodiments, the alkyl dimethicone is a blend of two or more species thereof, wherein the species differ in terms of the sum of (a+b+c), the ratio of a to the sum of (b+c), the value of c, or in two or more such parameters. In some embodiments, the alkyl dimethicone is a random structure. In some embodiments, $R^1$ is a linear alkyl group. In some embodiments, $R^2$ is a linear alkyl group.

The alkyl dimethicone materials of Formula V are characterized by having a (e.g. linear) polysiloxane backbone having terminal alkyl (C1-C4, typically methyl) silane groups and a plurality of pendent (e.g. linear) alkyl groups.

Methods of synthesizing dimethicone are known in the art. See for example U.S. Pat. No. 9,187,678; incorporated herein by reference.

While the structure of alkyl dimethicones are generally preferably linear structures, it will be understood by those of skill that such structures as synthesized or purchased can include an (e.g. small) amount of branching. Such branching, using terminology understood by those of skill, is referred to as "T" and "Q" functionality. In any of the embodiments herein, a substantially linear alkyl dimethicone structure can contain an amount of T branching, Q branching, or both.

In some embodiments, the siloxane (e.g. alkyl dimethicone) material has a melting temperature (peak endotherm as can be measured by DSC) of at least 140 or 150° F. ranging up to 170, 175, or 180° F.

The compounds described herein are not fluoroalkyl silsesquioxane materials having the chemical formula $[RSiO_{3/2}]_n$, wherein R comprises a fluoroalkyl or other fluorinated organic group.

Various organic polymeric binders can be utilized. Although fluorinated organic polymeric binders can also be utilized, fluorinated organic polymeric binders are typically considerably more expensive than non-fluorinated binders. Further, non-fluorinated organic polymeric binders can exhibit better adhesion to non-fluorinated polymeric, metal, or other substrates.

Suitable non-fluorinated binders include for example polystyrene, atactic polystyrene, acrylic (i.e. poly(meth) acrylate), polyester, polyurethane (including polyester type thermoplastic polyurethanes "TPU"), polyolefin (e.g. polyethylene), and polyvinyl chloride. Many of the polymeric materials that a substrate can be thermally processed from, as will subsequently be described, can be used as the non-fluorinated organic polymeric binder of the organic solvent coating composition. However, in typical embodiments, the non-fluorinated organic polymeric binder is a different material than the polymeric material of the substrate. In some embodiments, the organic polymeric binder typically has a receding contact angle with water of less than 90, 80, or 70 degrees. Thus, the binder is typically not a silicone material.

In some embodiments, the (e.g. non-fluorinated) organic polymeric binder is a film-grade resin, having a relatively high molecular weight. Film-grade resins can be more durable and less soluble in the liquid/solid (e.g. water, oil, paint, ice) being repelled. In other embodiments, the (e.g. non-fluorinated) organic polymeric binder can be a lower molecular weight film-forming resin. Film-forming resins can be more compliant and less likely to affect the mechanical properties of the substrate. Viscosity and melt flow index are indicative of the molecular weight. Mixtures of (e.g. non-fluorinated) organic polymeric binders can also be used.

In some embodiments, the film-grade (e.g. non-fluorinated) organic polymeric binder typically has a melt flow index of at least 1, 1.5, 2, 2.5, 3, 4, or 5 g/10 min at 200° C./5 kg ranging up to 20, 25, or 30 g/10 min at 200° C./5 kg. The melt flow index can be determined according to ASTM D-1238. The tensile strength of the (e.g. non-fluorinated) organic polymeric binder is typically at least 40, 45, 50, 55, or 60 MPa. Further, the (e.g. non-fluorinated) organic polymeric binder can have a low elongation at break of less than 10% or 5%. The tensile and elongation properties can be measured according to ASTM D-638.

In other embodiments, the (e.g. non-fluorinated) organic polymeric binders have a lower molecular weight and lower tensile strength than film-grade polymers. In one embodiment, the melt viscosity of the (e.g. non-fluorinated) organic polymeric binders (as measured by ASTM D-1084-88) at 400° F. (204° C.) ranges from about 50,000 to 100,000 cps. In another embodiment, the molecular weight (Mw) of the (e.g. non-fluorinated) organic polymeric binder is typically at least about 1000, 2000, 3000, 4000, or 5000 g/mole ranging up to 10,000; 25,000; 50,000; 75,000; 100,000; 200,000; 300,000; 400,000, or 500,000 g/mole. In some embodiments, the (e.g. non-flourinated) organic polymeric binder has a tensile strength of at least 5, 10, or 15 MPa ranging up to 25, 30, or 35 MPa. In other embodiments, the (e.g. non-fluorinated) organic polymeric binder has a tensile strength of at least 40, 45, or 50 MPa ranging up to 75 or 100 MPa. In some embodiments, the (e.g. non-fluorinated) organic polymeric binder has an elongation at break ranging up to 25, 50, 100, 200, 300, 400, 500, 600, 700, 800, 900, 1000% or higher. In some embodiments, the (e.g. non-fluorinated) organic polymeric binder has a Shore A hardness of at least 50, 60, 70, or 80 ranging up to 100.

In some embodiments, the (e.g. non-fluorinated) organic polymeric binder is selected such that it is compliant at the use temperature of the coated substrate or article. In this embodiment, the (e.g. non-fluorinated) organic polymeric binder has a glass transition temperature (Tg) as can be measured by DSC of less than 0° C. or 32° F. In some embodiments, the (e.g. non-fluorinated) organic polymeric binder has a glass transition temperature (Tg) of less than 20° F., 10° F., 0° F., −10° F., −20° F., −30° F., −40° F., −50° F., −60° F., −70° F., or −80° F. The (Tg) of many (e.g. non-fluorinated) organic polymeric binder is at least −130° C.

The selection of (e.g. non-fluorinated) organic polymeric binder contributes to the durability of the repellent surface. In some embodiments, the repellency is retained after surface abrasion testing (according to the test method described in the examples). In some embodiments, the liquid (e.g. paint) repellency may diminish to some extent, yet remains highly repellent after surface abrasion testing. Thus, after surface abrasion testing the contact angles or ice adhesion meets the criteria previously described. In other embodiments, the repellency is retained after soaking the repellent surface in water (according to the test method described in the examples). In yet other embodiments, the repellency is retained after repeatedly forming and removing ice from the liquid repellent surface.

In typical embodiments, the non-fluorinated organic polymeric binder does not form a chemical (e.g. covalent) bond with the siloxane material as this may hinder the migration of the siloxane material to the outermost surface layer.

In some embodiments, the (e.g. non-fluorinated) organic polymeric binder is not curable, such as in the case of alkyd resins. An alkyd resin is a polyester modified by the addition of fatty acids and other components, derived from polyols and a dicarboxylic acid or carboxylic acid anhydride. Alkyds are the most common resin or "binder" of most commercial "oil-based" paints and coatings.

The compositions comprising a siloxane material and a (e.g., non-fluorinated organic) polymeric binder can be dissolved, suspended, or dispersed in a variety of organic solvents to form a coating composition suitable for use in coating the compositions onto a substrate. The organic solvent coating compositions typically contain at least about 70%, 80%, 90%, 91%, 92%, 93%, 94%, 95%, 96%, 97%, 98%, 99% organic solvent or greater, based on the total weight of the coating composition. The coating compositions typically contain at least about 0.01%, 0.1%, 0.5%, 1%, 2%, 3%, 4%, 5%, 6%, 7%, 8%, 9%, 10%, 15% or greater solids of the (e.g. non-fluorinated organic) polymeric binder and siloxane material, based on the total weight of the coating composition. However, the coating composition can be provided with an even higher amount of solids, e.g. 20, 30, 40, or 50 wt.-% solids. Suitable organic solvents include for example alcohols, esters, glycol ethers, amides, ketones, hydrocarbons, chlorohydrocarbons, hydrofluorocarbons, hydrofluoroethers, chlorocarbons, and mixtures thereof.

The coating composition may contain one or more additives provided the inclusion of such does not detract from the (e.g. liquid, ice) repellent properties.

The coating compositions can be applied to a substrate or article by standard methods such as, for example, spraying, padding, dipping, roll coating, brushing, or exhaustion (optionally followed by the drying of the treated substrate to remove any remaining water or organic solvent). The substrate can be in the form of sheet articles that can be subsequently thermally formed into a substrate or component. When coating flat substrates of appropriate size, knife-coating or bar-coating may be used to ensure uniform coating of the substrate.

The moisture content of the organic coating composition is preferably less than 1000, 500, 250, 100, 50 ppm. In some embodiments, the coating composition is applied to the substrate at a low relative humidity, e.g. of less than 40%, 30% or 20% at 25° C.

The coating compositions can be applied in an amount sufficient to achieve the desired repellency properties. Coatings as thin as 250, 300, 350, 400, 450, or 500 nm ranging up to 1, 1.5, 2, 2.5, 3, 3.5, 4, 4.5, or 5 microns can provide the desired repellency. However, thicker coatings (e.g., up to about 10, 15, 20 microns or more) can also be used. Thicker coatings can be obtained by applying to the substrate a single thicker layer of a coating composition that contains a relatively high solids concentration. Thicker coatings can also be obtained by applying successive layers to the substrate.

In another embodiment, the siloxane material can be combined with a thermally processible (e.g. thermoplastic) polymer and then melt processed into an article, substrate thereof, or surface layer thereof. In this embodiment, the siloxane material typically migrates to the surface forming a surface layer with a high concentration of siloxane material relative to the total amount of siloxane material and thermally processible polymer.

In typical embodiments, the amount of siloxane material melt additive is at least about 0.05, 0.1, 0.25, 0.5, 1.5, 2.0 or 2.5 wt.-% and in some embodiments, at least about 3.0, 3.5, 4.0, 4.5 or 5 wt.-%. The amount of siloxane material is typically no greater than 25, 20, 15, or 10 wt.-% of the sum of the siloxane material melt additive and thermally processible polymer.

To form a polymer blend by melt processing, the siloxane material can be, for example, mixed with pelletized, granular, powdered or other forms of the thermally processible polymer and then melt processed by known methods such as, for example, molding or melt extrusion. The siloxane material can be mixed directly with the polymer or it can be mixed with the polymer in the form of a "master batch" (concentrate) of the siloxane material in the polymer. If desired, an organic solution of the siloxane material can be mixed with powdered or pelletized polymer, followed by drying (to remove solvent) and then melt processing. Alternatively, the siloxane composition can be added to the polymer melt to form a mixture or injected into a molten polymer stream to form a blend immediately prior to extrusion or molding into articles.

In some embodiments, the melt processible (e.g. thermoplastic) polymer is a polyolefin, polyester, polyamide, polyurethane, or polyacrylate.

The siloxane melt additives are generally a solid at room temperature (e.g. 25° C.) and at the use temperature of the article as previously described. The siloxane material and thermally processible polymer are selected such that the siloxane material is typically molten at the melt processing temperature of the mixture. In some embodiments, the siloxane material has a melt temperature no greater than 200, 190, 180, 170, or 160° C.

Extrusion can be used to form polymeric films. In film applications, a film forming polymer is simultaneously melted and mixed as it is conveyed through the extruder by a rotating screw or screws and then is forced out through a slot or flat die, for example, where the film is quenched by a variety of techniques known to those skilled in the art. The films optionally are oriented prior to quenching by drawing or stretching the film at elevated temperatures. Adhesive can optionally be coated or laminated onto one side of the extruded film in order to apply and adhere the (liquid, ice) repellent film onto a substrate.

Molded articles are produced by pressing or by injecting molten polymer from a melt extruder as described above into a mold where the polymer solidifies. Typical melt forming techniques include injection molding, blow molding, compression molding and extrusion, and are well known to those skilled in the art. The molded article is then ejected from the mold and optionally heat-treated to effect migration of the polymer additives to the surface of the article.

After melt processing, an annealing step can be carried out to enhance the development of repellent characteristics. The annealing step typically is conducted below or above the melt temperature of the polymer for a sufficient period of time. The annealing step can be optional.

The (e.g. liquid, ice) repellent coating composition can be provided on a wide variety of organic or inorganic substrates.

Suitable polymeric materials for substrates include, but are not limited to, polyesters (e.g., polyethylene terephthalate or polybutylene terephthalate), polycarbonates, acrylonitrile butadiene styrene (ABS) copolymers, poly(meth)acrylates (e.g., polymethylmethacrylate, or copolymers of various (meth)acrylates), polystyrenes, polysulfones, polyether sulfones, epoxy polymers (e.g., homopolymers or epoxy addition polymers with polydiamines or polydithiols), polyolefins (e.g., polyethylene and copolymers thereof or polypropylene and copolymers thereof), polyvinyl chlorides, polyurethanes, fluorinated polymers, cellulosic materials, derivatives thereof, and the like. In some embodiments, where increased transmissivity is desired, the polymeric substrate can be transparent. The term "transparent" means transmitting at least 85 percent, at least 90 percent, or at least 95 percent of incident light in the visible spectrum (wavelengths in the range of 400 to 700 nanometers). Transparent substrates may be colored or colorless.

Suitable inorganic substrates include metals and siliceous materials such as glass. Suitable metals include pure metals, metal alloys, metal oxides, and other metal compounds. Examples of metals include, but are not limited to, chromium, iron, aluminum, silver, gold, copper, nickel, zinc, cobalt, tin, steel (e.g., stainless steel or carbon steel), brass, oxides thereof, alloys thereof, and mixtures thereof.

The coating composition can be used to impart or enhance (e.g. ice, aqueous liquid and/or oil) repellency of a variety of substrates and articles. The term "ice" includes any form of frozen water as previously described.

The term "aqueous" means a liquid medium that contains at least 50, 55, 60, 65, or 70 wt-% of water. The liquid medium may contain a higher amount of water such as at least 75, 80, 85, 90, 95, 96, 97, 98, 99, or 100 wt-% water. The liquid medium may comprise a mixture of water and one or more water-soluble organic cosolvent(s), in amounts such that the aqueous liquid medium forms a single phase. Examples of water-soluble organic cosolvents include for example methanol, ethanol, isopropanol, 2-methoxyethanol, (2-methoxymethylethoxy)propanol, 3-methoxypropanol, 1-methoxy-2-propanol, 2-butoxyethanol, ethylene glycol, ethylene glycol mono-2-ethylhexylether, tetrahydrofuran, 2,2,4-trimethyl-1,3-pentanediol monoisobutyrate, tetraethylene glycol di(2-ethylhexoate), 2-ethylhexylbenzoate, and ketone or ester solvents. The amount of organic cosolvent does not exceed 50 wt-% of the total liquids of the coating composition. In some embodiments, the amount of organic cosolvent does not exceed 45, 40, 35, 30, 25, 20, 15, 10 or 5 wt-% organic cosolvent. Thus, the term aqueous includes (e.g. distilled) water as well as water-based solutions and dispersions such as paint.

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

METHODS

Method for Contact Angle Measurements

Water and hexadecane contact angles were measured using a Ramé-Hart goniometer (Ramé-Hart Instrument Co., Succasunna, N.J.). Advancing ($\theta_{adv}$) and receding ($\theta_{rec}$) angles were measured as the test liquid (e.g. water or hexadecane) was supplied via a syringe into or out of sessile droplets (drop volume ~5 μL). Measurements were taken at 2 different spots on each surface, and the reported measurements are the averages of the four values for each sample (a left-side and right-side measurement for each drop).

Ice Adhesion Cuvette Method

A hole is punched into the side wall near the bottom of a cuvette (having a 1 cm×1 cm cross-section and a height of 4.4 cm). The cuvette is inverted such that its opening is placed in contact with the test surface, and a rubber band is wrapped around the cuvette to ensure constant contact with the substrate. This setup is placed in an environmental chamber at −20° C. for ~30 min, and 1 mL of water at 0° C. is injected through the hole into the cuvette. The water comes into contact with the test substrate and a column of ice encased in the cuvette forms when the sample is held at −20° C. for 15-20 hours. The rubber band is carefully removed and the iced sample is mounted onto the test apparatus. The force required to detach the ice columns from the test substrates was measured by propelling the force probe into the side of the column at a velocity of 2.6"/minute. The probe was located ˜1 mm above the substrate to minimize torque on the ice columns.

Example 1 (Ex1)

Preparation of Film with Siloxane Melt Additive

A siloxane melt additive (alkyl dimethicone) was synthesized as described in Example 14 of U.S. Pat. No. 9,187,678. The alkyl dimethicone was compounded into NA217000 LDPE (Lyondell Basell, Houston, Tex.) at a loading of 15 wt % using a 25 mm twin screw extruder held at 190° C. The alkyl dimethicone was delivered to the extruder as a liquid at 120° C. by means of a heated gear pump and transfer line. The masterbatch melt was extruded through a stranding die into a chilled water bath and pelletized at a rate of 13.6 Kg/hour. These 15 wt % alkyl dimethicone masterbatch pellets were then admixed with NA217000 LDPE pellets at a ratio which yielded a pellet mixture comprising 3 wt % alkyl dimethicone in LDPE.

This 3 wt % alkyl dimethicone mixture was extrusion coated sequentially onto both sides of 2 mil thick PET film (primed on both sides, 3M Company) using the following procedure. The pellet blend was fed, via a single feed hopper, at a rate of 20 lbs/hr into an extruder and die operating at a temperature of 500° F. The composite extrudate exited the drop die opening and traveled approximately 10 cm to a nip where the composite was contacted with the primed PET and solidified through a two roll nip equipped with a rubber and a steel roller. The alkyl dimethicone/LDPE layer contacted a smooth chilled steel roll which was used to accelerate the solidification of the layers. The line speed was 50 ft/min, yielding an extruded layer thickness of 1 mil. The final film construction consisted of a 2 mil thick PET film sandwiched between 1 mil thick layers comprising 3 wt % alkyl dimethicone in LDPE.

The contact angles of EX1 were determined in the same manner as previously described. The results were as follows:

| Example | Water Contact Angles | | | 10% (by wt.) aqueous 2-n-butoxyethanol Contact Angles | | |
|---|---|---|---|---|---|---|
|  | $\theta_{adv}$ | $\theta_{rec}$ | CAH ($\theta_{adv} - \theta_{rec}$) | $\theta_{adv}$ | $\theta_{rec}$ | CAH ($\theta_{adv} - \theta_{rec}$) |
| EX1 | 112 | 97 | 15 | 56 | 47 | 9 |

Surface Abrasion Test

A sample of sufficient size (e.g., 6 cm by 2 cm) was prepared and mounted on a Taber Abraser (Taber Industries 5750 Linear Abraser). A crockmeter square (AATC Crockmeter Square from Testfabrics, Inc.) was attached to the abraser head by means of a rubber band. No additional weights were placed on top of the abraser head. The cycle speed was set to 15 cycles/min, and each substrate was subjected to 2 abrasion cycles (or in otherwords that abraser head passed back and forth twice).

Contact angles with a solution containing 10% by weight of 2-n-butoxyethanol and 90% by weight deionized water were tested after being subjected to this surface abrasion.

| Example | 10% (by wt.) aqueous 2-n-butoxyethanol Contact Angles After Abrasion | | |
|---|---|---|---|
|  | $\theta_{adv}$ | $\theta_{rec}$ | CAH ($\theta_{adv} - \theta_{rec}$) |
| EX1 | 53 | 45 | 8 |

The repellency of EX1 after abrasion was also evaluated by measuring the contact angles with water as previously described. The results were as follows:

| Example | Water Contact Angles After Abrasion | | |
|---|---|---|---|
|  | $\theta_{adv}$ | $\theta_{rec}$ | CAH ($\theta_{adv} - \theta_{rec}$) |
| EX1 | 109 | 99 | 10 |

The ice adhesion of EX 1 was evaluated according to the Cuvette method previously described. The ice adhesion was 143 kPa with a standard deviation of 21.

What is claimed is:

1. An article subject to ice formation during normal use comprising a repellent surface such that the receding contact angle of the surface with water ranges from 90 degrees to 135 degrees wherein the repellent surface comprises a siloxane material comprising a polysiloxane backbone and pendent hydrocarbon groups averaging at least 8 carbon atoms.

2. The article of claim 1 wherein the siloxane material has a molecular weight of at least 1500 g/mole and no greater than 100,000 g/mole.

3. The article of claim 1 wherein the siloxane material has a melt temperature of no greater than 200° C.

4. The article of claim 1 wherein the repellent surface further comprises a non-fluorinated organic polymeric binder.

5. The article of claim 1 wherein the hydrocarbon moiety is a saturated alkyl moiety.

6. The article of claim 4 wherein the non-fluorinated polymeric binder is selected from polystyrene, acrylic, polyester, polyurethane, polyolefin, and polyvinyl chloride.

7. The article of claim 1 wherein the repellent surface exhibits a difference between the advancing contact angle and receding contact angle with water of less than 20 degrees.

8. The article of claim 1 wherein the repellent surface exhibits a receding contact angle with water of at least 90 degrees after soaking in water for 24 hours.

9. The article of claim 1 wherein the repellent surface exhibits a receding contact angle with a 10% by weight aqueous solution of 2-n-butoxyethanol of at least 40 degrees.

10. The article of claim 1 wherein the repellent surface exhibits a receding contact with water of at least 90 degrees after 2 abrasion cycles at 15 cycles/minutes with a Taber Linear Abraser.

11. The article of claim 1 wherein the siloxane material is not a fluoroalkyl silsesquioxane.

12. The article of claim 1 wherein the article comprises the repellent surface disposed on a substrate.

13. The article of claim 12 wherein the substrate is a metal substrate.

14. The article of claim 1 wherein the article is selected from the group consisting of sign faces, signal transmission lines, satellite dishes, antennas, wind turbine blades, automobiles, railroad cars, aircraft, watercraft, navigation equipment heat pumps exchanger; ice manufacturing facilities and articles; refrigerators, freezers; cryogenic and supercomputer storage facilities; buildings, transportation signs, roofing, dams, oil drilling platforms, outdoor sporting equipment recreational vehicles, and snow removal equipment.

15. The article of claim 1 wherein the repellent surface reduces the force of ice adhesion in comparison to the same article without the repellent surface.

16. A method of making an article comprising;
providing an article subject to ice formation during normal use;
providing a liquid repellent surface according to claim 1 on at least a portion of the article.

17. The method of claim 16 wherein the repellent surface is provided by coating the article with a composition comprising an organic solvent, a siloxane material and a non-fluorinated polymeric binder; and removing the organic solvent.

18. The method of claim 16 wherein the repellent surface is provided by forming the article or a surface layer thereof from a melt processable polymer further comprising a siloxane material.

19. An article subject to ice formation during normal use comprising a repellent surface such that the receding contact angle of the surface with water ranges from 90 degrees to 135 degrees and the receding contact angle with a 10% by weight aqueous solution of 2-n-butoxyethanol is at least 40 degrees, wherein the repellent surface comprises a siloxane material.

20. The article of claim 19 wherein the repellent surface further comprises a non-fluorinated organic polymeric binder.

21. The article of claim 20 wherein the non-fluorinated polymeric binder is selected from polystyrene, acrylic, polyester, polyurethane, polyolefin, and polyvinyl chloride.

22. The article of claim 19 wherein the article is selected from the group consisting of sign faces, signal transmission lines, satellite dishes, antennas, wind turbine blades, automobiles, railroad cars, aircraft, watercraft, navigation equipment; heat pumps and exchangers; ice manufacturing facilities and articles; refrigerators, freezers; cryogenic and supercomputer storage facilities; buildings, transportation signs, roofing, dams, oil drilling platforms, outdoor sporting equipment; recreational vehicles, and snow removal equipment.

* * * * *

UNITED STATES PATENT AND TRADEMARK OFFICE
CERTIFICATE OF CORRECTION

PATENT NO. : 10,907,070 B2
APPLICATION NO. : 16/080047
DATED : February 2, 2021
INVENTOR(S) : Adam Meuler et al.

It is certified that error appears in the above-identified patent and that said Letters Patent is hereby corrected as shown below:

In the Specification

Column 7,
Line 14, delete "non-flourinated)" and insert -- non-fluorinated) --, therefor.

Column 10,
Line 64, after "onto the" insert -- $I_{mass}$ --.

In the Claims

Column 12,
Line 66, in Claim 13, before "substrate" insert -- inorganic --.

Column 13,
Lines 4 & 5, in Claim 14, delete "equipment" and insert -- equipment; --, therefor.
Line 5, in Claim 14, after "pumps" insert -- and --.
Line 5, in Claim 14, delete "exchanger;" and insert -- exchangers; --, therefor.
Line 8, in Claim 14, delete "equipment" and insert -- equipment; --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*